(12) United States Patent
Sinusas et al.

(10) Patent No.: US 10,710,725 B2
(45) Date of Patent: Jul. 14, 2020

(54) AIRCRAFT RESTRAINT SYSTEMS WITH UNFIXED DEFAULT MODE

(71) Applicant: Textron Innovations Inc., Providence, RI (US)

(72) Inventors: Eric A. Sinusas, Euless, TX (US); Olivier Andre Boisvert, Mirabel (CA); Guillaume Noiseux-Boucher, Mirabel (CA); Steve Loveland, Keller, TX (US); Sebastien Duval, Terrebonne (CA)

(73) Assignee: Textron Innovations Inc., Providence, RI (US)

( * ) Notice: Subject to any disclaimer, the term of this patent is extended or adjusted under 35 U.S.C. 154(b) by 329 days.

(21) Appl. No.: 15/832,694

(22) Filed: Dec. 5, 2017

(65) Prior Publication Data
US 2019/0168879 A1 Jun. 6, 2019

(51) Int. Cl.
*B64D 11/06* (2006.01)
*B64D 25/02* (2006.01)

(52) U.S. Cl.
CPC ............ *B64D 11/062* (2014.12); *B64D 25/02* (2013.01)

(58) Field of Classification Search
CPC .............................. B64D 11/062; B64D 25/02
See application file for complete search history.

(56) References Cited

U.S. PATENT DOCUMENTS

| 2,845,234 | A | 7/1958 | Cushion et al. |
| 4,090,735 | A | 5/1978 | Czernakowski |
| 4,277,037 | A | 7/1981 | Loose et al. |
| 4,566,649 | A | 1/1986 | Petersen |
| 4,667,904 | A * | 5/1987 | Herndon ................ B64D 11/06 244/122 AG |
| 4,732,409 | A | 3/1988 | Colasanti |
| 7,438,150 | B2 | 10/2008 | Higashiyama |

(Continued)

FOREIGN PATENT DOCUMENTS

| WO | 2010027269 A1 | 3/2010 | |
| WO | WO-2010027269 A1 * | 3/2010 | ............. B64D 25/06 |

OTHER PUBLICATIONS

European Exam Report; Application No. EP 18155550.9; European Patent Office; dated May 31, 2018.

(Continued)

*Primary Examiner* — Philip J Bonzell
*Assistant Examiner* — Tye Wliam Abell
(74) *Attorney, Agent, or Firm* — Lawrence Youst PLLC (57) ABSTRACT

A modal restraint system for an occupant of a seat of an aircraft includes a strap feeder unit and a strap selectively retractable into and extendable from the strap feeder unit. The strap is positionable adjacent to the occupant so as to dispose the occupant between the strap and the seat. The strap feeder unit is adapted to switch between a plurality of modes including an unfixed mode and a fixed mode. The strap is extendable from and retractable into the strap feeder unit in the unfixed mode. The strap is substantially unextendable from the strap feeder unit in the fixed mode. The strap feeder unit is in the unfixed mode by default. The strap feeder unit is operable to switch to the fixed mode in response to a precautionary event, thereby reducing freedom of movement of the occupant relative to the seat of the aircraft.

20 Claims, 7 Drawing Sheets

(56) References Cited

U.S. PATENT DOCUMENTS

| | | |
|---|---|---|
| 8,874,288 B1 * | 10/2014 | Siddiqui ................ G01C 23/00 |
| | | 701/1 |
| 2003/0160497 A1 | 8/2003 | Darr |
| 2004/0017073 A1 | 1/2004 | Pavlov et al. |
| 2004/0036345 A1 | 2/2004 | Herberg et al. |
| 2006/0082126 A1 | 4/2006 | Clute |
| 2009/0261568 A1 | 10/2009 | Ehlers |
| 2011/0001312 A1 | 1/2011 | Schubert et al. |
| 2013/0175403 A1 * | 7/2013 | Spray .................... B60T 8/1703 |
| | | 244/235 |
| 2017/0283079 A1 | 10/2017 | Meadows et al. |

OTHER PUBLICATIONS

European Search Report; Application No. EP 18155550.9; European Patent Office; dated May 14, 2018.

\* cited by examiner

AIRCRAFT RESTRAINT SYSTEMS WITH UNFIXED DEFAULT MODE

TECHNICAL FIELD OF THE DISCLOSURE

The present disclosure relates, in general, to aircraft restraint systems and, in particular, to modal aircraft restraint systems for aircraft having two or more modes of operation including an unfixed mode and a fixed mode, of which the former is the default mode of operation.

BACKGROUND

To promote the safety of aircraft occupants, aircraft must meet certain head injury criteria (HIC) requirements. To meet HIC requirements, the head movements of an aircraft occupant in an HIC event should result in a minimal or below-threshold head injury. For example, aircraft certification in the United States requires engineers to demonstrate that a head strike into any one of several cabin furnishings complies with the HIC requirements specified in 14 C.F.R § 23.562 and 14 C.F.R § 25.562. HIC requirements may be satisfied in several ways, such as by providing head clearance and/or soft impact surfaces around the aircraft occupant. Both of these solutions, however, add cost and weight to the aircraft.

Aircraft must include restraint systems to enhance occupant safety. For example, some aircraft include fixed seatbelts, which have a strap that does not extend in response to the bodily movement of the occupant. While fixed seatbelts may provide a short HIC trajectory, allowing for smaller seat pitch installation, fixed seatbelts are uncomfortable and may severely limit the mobility of the occupant, including hampering the pilot's ability to reach controls and look through windows. Other aircraft include inertia reel seatbelts, which have a strap that is extendable or retractable except when occupant movement reaches a threshold that causes the inertia reel to lock, preventing further extension of the strap. Inertia reel seatbelts have a delayed reaction time for locking the occupant into a secured position, resulting in increased head motion than that allowed by a fixed seatbelt. Accordingly, a need has arisen for a modal restraint system that provides a similar or superior range of head motion as compared to a fixed seatbelt, while also increasing occupant comfort and mobility.

SUMMARY

In a first aspect, the present disclosure is directed to a modal restraint system for an occupant of a seat of an aircraft. The modal restraint system includes a strap feeder unit and a strap selectively retractable into and extendable from the strap feeder unit. The strap is positionable adjacent to the occupant so as to dispose the occupant between the strap and the seat. The strap feeder unit is adapted to switch between a plurality of modes including an unfixed mode and a fixed mode. The strap is extendable from and retractable into the strap feeder unit in the unfixed mode. The strap is substantially unextendable from the strap feeder unit in the fixed mode. The strap feeder unit is in the unfixed mode by default. The strap feeder unit is operable to switch to the fixed mode in response to a precautionary event, thereby reducing freedom of movement of the occupant relative to the seat of the aircraft.

In some embodiments, the strap feeder unit may include a spool operable to rotate in first and second directions to wind and unwind the strap thereabout, respectively. In certain embodiments, the strap feeder unit may include a locking module, the locking module engaging with the spool when the strap feeder unit is in the fixed mode to impede the spool from rotating in the second direction such that the strap is substantially unextendable. In some embodiments, the plurality of modes may include a retracted fixed mode and the strap feeder unit may include a retraction module adapted to rotate the spool in the first direction to retract the strap into the strap feeder unit in the retracted fixed mode, thereby tightening the strap against the occupant. In such embodiments, the strap feeder unit may be further operable to switch to the retracted fixed mode in response to the precautionary event. In certain embodiments, the unfixed mode may include an inertia reel mode and the strap feeder unit may include an inertia reel subassembly selectively engagable with the spool in the inertia reel mode. In some embodiments, the strap feeder unit may be further operable to revert or switch to the unfixed mode after the precautionary event. In certain embodiments, the strap may include a torso strap positionable adjacent to the torso of the occupant. In some embodiments, the strap may include a lap strap positionable adjacent to the lap region of the occupant.

In certain embodiments, the precautionary event may anticipate a life-threatening acceleration event. In some embodiments, the life-threatening acceleration event may include a hard landing, a collision, an uncontrolled descent or turbulence. In certain embodiments, switching the strap feeder unit to the fixed mode in response to the precautionary event may reduce the freedom of movement of the occupant during the life-threatening acceleration event. In some embodiments, the modal restraint system may include a lock selector in communication with the strap feeder unit, and the precautionary event may include selection of the lock selector by the occupant. In certain embodiments, the lock selector may be switchable between a locked position and an unlocked position, and the precautionary event may include switching the lock selector from the unlocked position to the locked position. In some embodiments, the lock selector may include an input device such as a button, a lever, a knob or a pull cord. In certain embodiments, the lock selector may be proximate to the seat.

In a second aspect, the present disclosure is directed to an aircraft including a fuselage, a plurality of seats in the fuselage and a modal restraint system including a plurality of seatbelt subsystems. Each seatbelt subsystem is adapted to secure an occupant to one of the seats. Each seatbelt subsystem includes a strap feeder unit and a strap selectively retractable into and extendable from the strap feeder unit. The strap is positionable adjacent to the occupant so as to dispose the occupant between the strap and the seat. The strap feeder unit is adapted to switch between a plurality of modes including an unfixed mode and a fixed mode. The strap is extendable from and retractable into the strap feeder unit in the unfixed mode. The strap is substantially unextendable from the strap feeder unit in the fixed mode. The strap feeder unit is in the unfixed mode by default. The strap feeder unit is operable to switch to the fixed mode in response to a precautionary event, thereby reducing freedom of movement of the occupant relative to the seat.

In some embodiments, at least a portion of the seatbelt subsystems may be located in the cockpit or passenger cabin of the aircraft. In certain embodiments, the unfixed mode may include an inertia reel mode. In some embodiments, the plurality of modes may include a retracted fixed mode, the strap feeder unit may retract the strap in the retracted fixed mode to tighten the strap against the occupant and the strap feeder unit may be further operable to switch to the retracted fixed mode in response to the precautionary event. In certain embodiments, the modal restraint system may include a master lock selector in communication with each of the seatbelt subsystems, the precautionary event may include selection of the master lock selector and the selection of the master lock selector may cause or allow the strap feeder units of each of the seatbelt subsystems to switch to the retracted fixed mode. In some embodiments, the aircraft may include a plurality of flight operation modes including a visual flight rules operation mode and an instrument flight rules operation mode, and the precautionary event may include switching to the instrument flight rules operation mode. In certain embodiments, the strap feeder unit may be further operable to revert or switch to the default unfixed mode in response to switching from the instrument flight rules operation mode to the visual flight rules operation mode.

In some embodiments, the aircraft may include one or more sensors each operable to detect an operational parameter and the precautionary event may include the one or more sensors detecting the operational parameter to be beyond a predetermined threshold. In certain embodiments, the one or more sensors may include an accelerometer, a descent rate sensor, a yaw rate sensor, a roll rate sensor, a pitch rate sensor and/or a traffic alert sensor. In some embodiments, the aircraft may include a landing gear sensor operable to detect deployment of the landing gear, and the precautionary event may include the landing gear sensor detecting deployment of the landing gear. In certain embodiments, the aircraft may include a mechanical failure sensor, and the precautionary event may include the mechanical failure sensor detecting an aircraft mechanical failure. In some embodiments, the modal restraint system may include a master lock selector in communication with each of the seatbelt subsystems, the precautionary event may include selection of the master lock selector and the selection of the master lock selector may cause or allow the strap feeder units of each of the seatbelt subsystems to switch to the fixed mode. In certain embodiments, the master lock selector may be located in the cockpit and selectable by a pilot. In some embodiments, switching to the fixed mode may reduce freedom of forward movement of the occupant relative to the seat.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
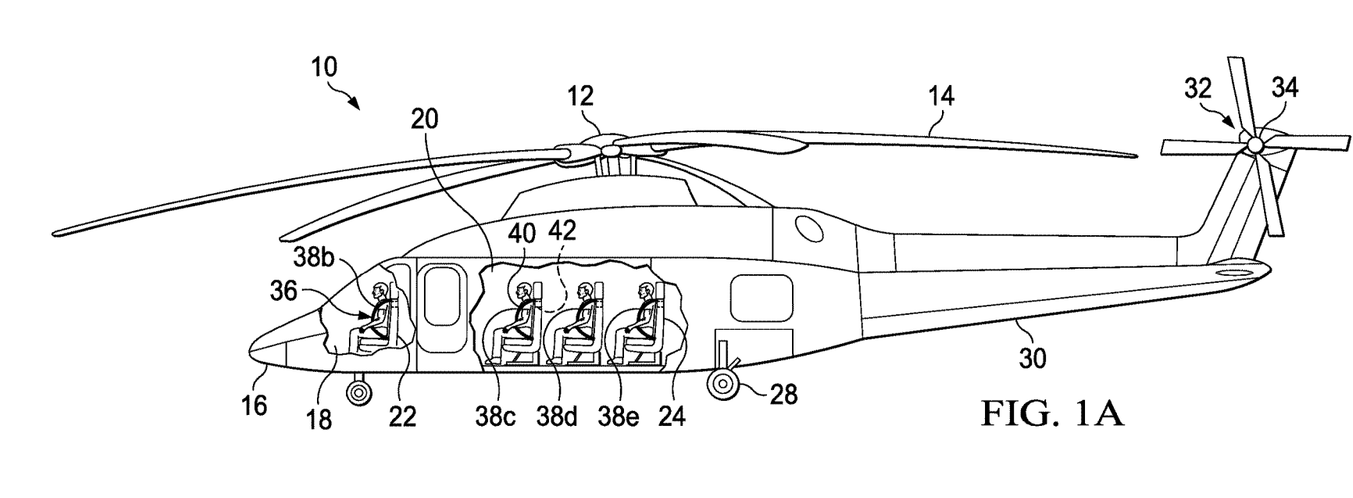
FIGS. 1A-1B are schematic illustrations of a rotorcraft implementing a modal restraint system in accordance with embodiments of the present disclosure.
Figure 1B:
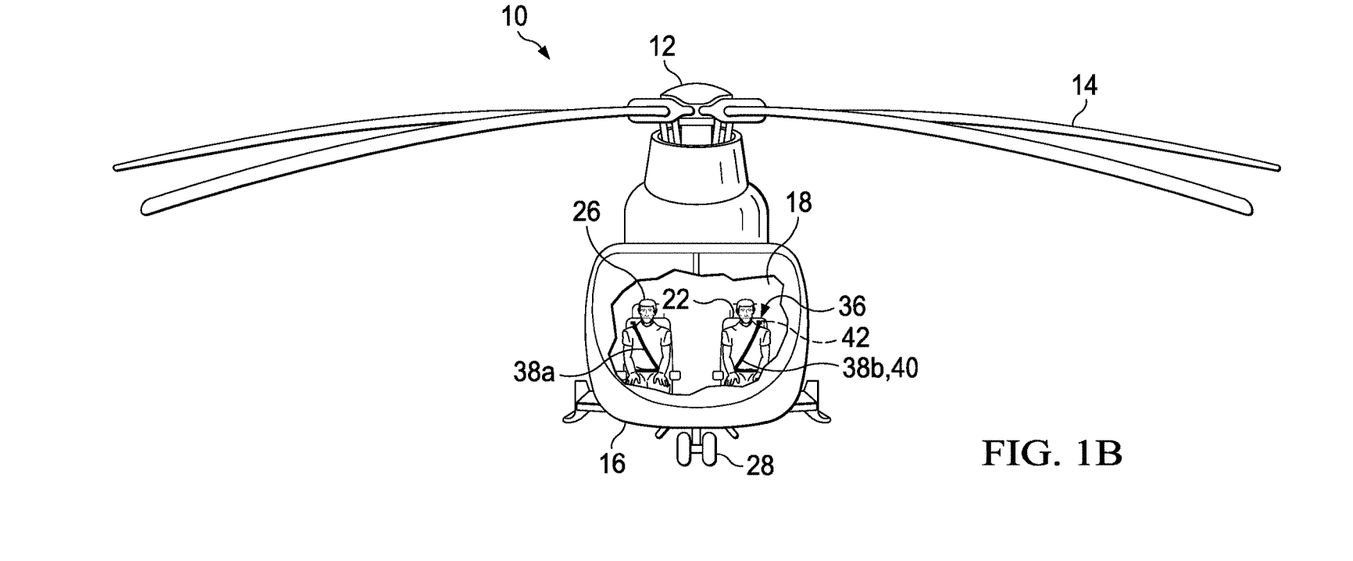

Referring to FIGS. 1A-1B in the drawings, a rotorcraft is schematically illustrated and generally designated 10. Rotorcraft 10 is a helicopter having a main rotor 12, which includes a plurality of rotor blade assemblies 14. Main rotor 12 is rotatable relative to a fuselage 16, which includes a cockpit 18 and a passenger cabin 20. Cockpit 18 and passenger cabin 20 include seats 22, 24, respectively, intended for occupants 26, such as pilots, crewmembers, passengers and the like. The pitch of rotor blade assemblies 14 can be collectively and/or cyclically manipulated to selectively control direction, thrust and lift of rotorcraft 10. A landing gear system 28 provides ground support for rotorcraft 10. A tailboom 30 extends from fuselage 16. A tail section 32 includes a tail rotor 34 that is rotatably coupled to the aft portion of tailboom 30. Tail rotor 34 controls the yaw of rotorcraft 10.

Rotorcraft 10 includes a modal restraint system 36, which includes seatbelt, or restraint, subsystems 38a-38e. Seatbelt subsystems 38a, 38b are located in cockpit 18 and seatbelt subsystems 38c-38e are located in passenger cabin 20. Each seatbelt subsystem 38a-38e is adapted to secure one of occupants 26 to a respective seat 22, 24. Each seatbelt subsystem 38a-38e includes a strap 40 that is selectively retractable into and extendable from a strap feeder unit 42. Seatbelt subsystems 38a-38e may be switched between a plurality of modes including a fixed mode and an unfixed mode. In fixed mode, strap 40 is substantially unextendable from strap feeder unit 42. In unfixed mode, strap 40 is extendable from and retractable into strap feeder unit 42. In some embodiments, the modes of seatbelt subsystems 38a-38e may include a retracted fixed mode in which strap 40 is retracted into strap feeder unit 42 to tighten strap 40 against occupants 26. In other embodiments, the modes of seatbelt subsystems 38*a*-38*e* may include an inertia reel mode, a type of unfixed mode, in which strap 40 is retractable into and extendable from strap feeder unit 42 unless strap 40 is pulled with a force sufficient to prevent strap feeder unit 42 from extending strap 40 any further, as may occur if the body of an occupant moves relative to rotorcraft 10 or seats 22, 24 with sufficient force.

In some embodiments, seatbelt subsystems 38*a*-38*e* are in unfixed mode by default, or during normal operation of rotorcraft 10 in the absence of user, computer or other input to specify the mode of seatbelt subsystems 38*a*-38*e*. In these embodiments, seatbelt subsystems 38*a*-38*e* may switch to fixed mode in response to a precautionary event, such as sudden acceleration or low visibility, which may occur in anticipation of a life-threatening acceleration event, or HIC event, such as a collision. Switching to fixed mode reduces the freedom of bodily movement of occupants 26 relative to their respective seats 22, 24 should the life-threatening acceleration event occur, thereby enhancing occupant safety. The interchangeability of modal restraint system 36 between various modes provides occupants 26 with added comfort and mobility, while also fixedly securing occupants 26 to seats 22, 24 to prevent injury or loss of life should a life-threatening acceleration event occur.

It should be appreciated that rotorcraft 10 is merely illustrative of a variety of aircraft that can implement the embodiments disclosed herein. Indeed, modal restraint system 36 may be utilized on any aircraft having one or more occupants. Other aircraft implementations can include hybrid aircraft, tiltrotor aircraft, tiltwing aircraft, quad tiltrotor aircraft, gyrocopters, airplanes and the like. As such, those skilled in the art will recognize that modal restraint system 36 can be integrated into a variety of aircraft configurations. It should be appreciated that even though aircraft are particularly well-suited to implement the embodiments of the present disclosure, non-aircraft vehicles and devices can also implement the embodiments.

Figure 2A:
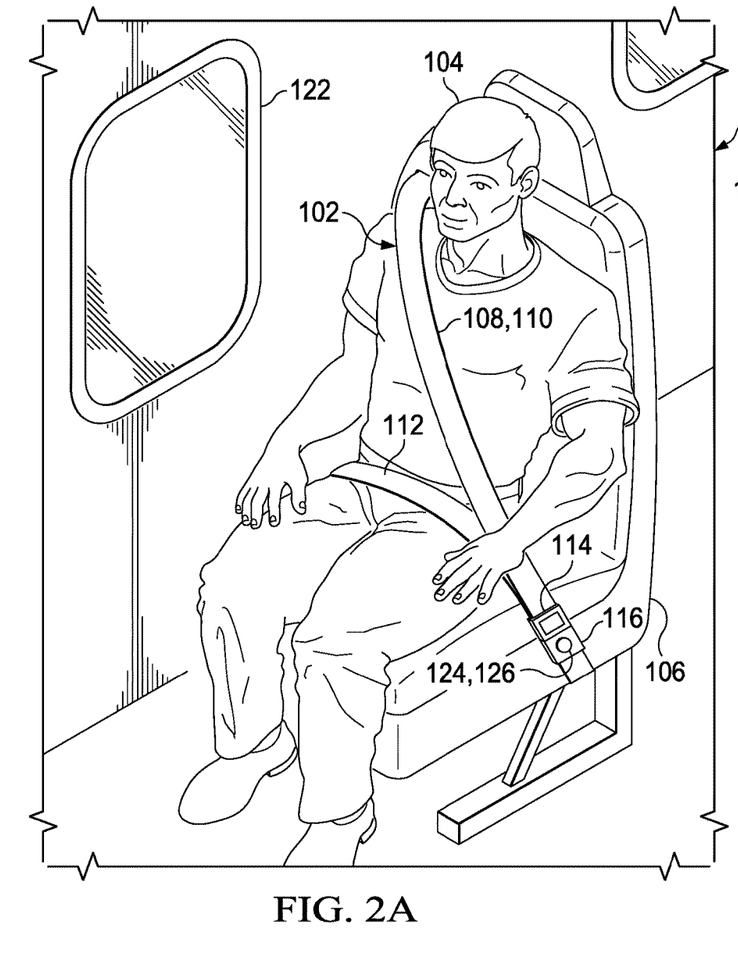
FIGS. 2A-2C are various views of a seatbelt subsystem in accordance with embodiments of the present disclosure.
Figure 2B:
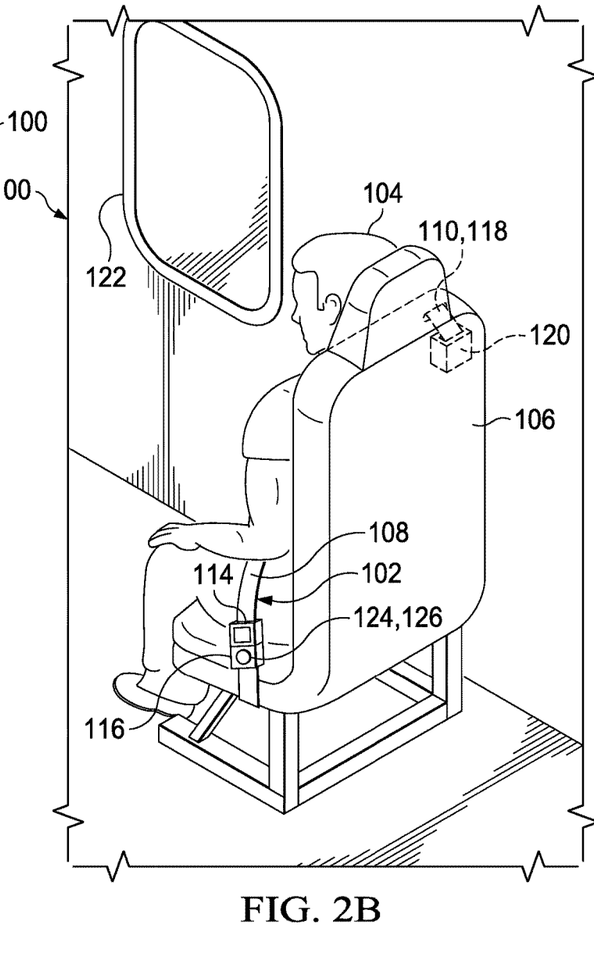
Figure 2C:
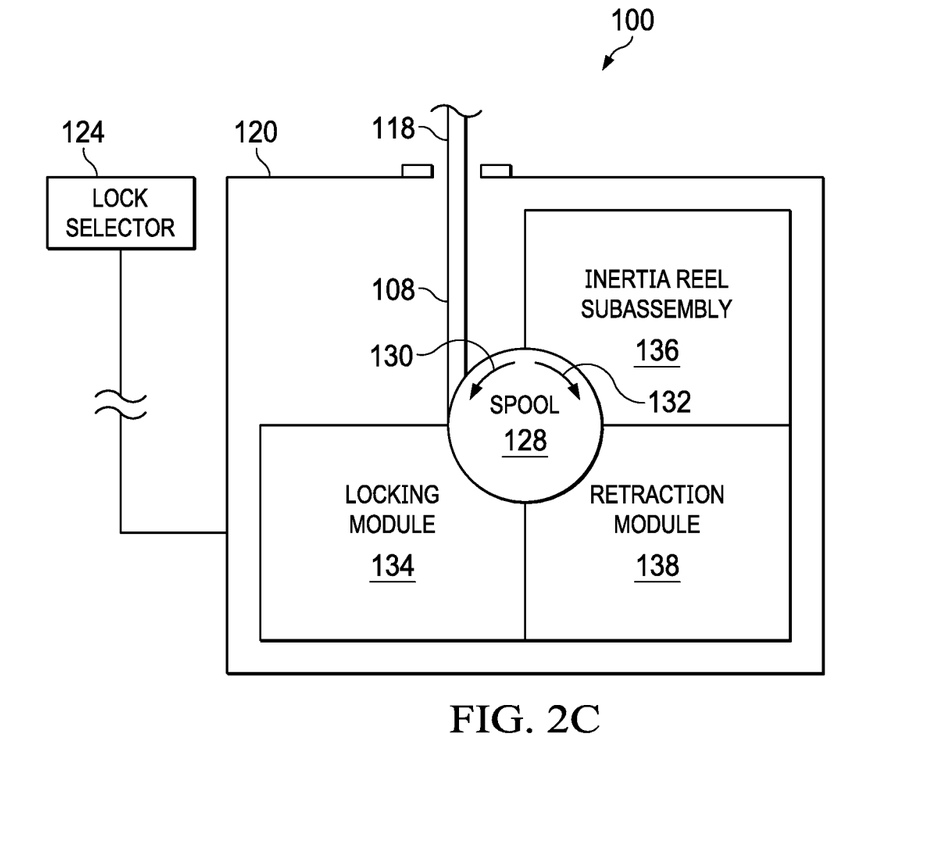

Referring to FIGS. 2A-2C in the drawings, a modal restraint system for an aircraft is schematically illustrated and generally designated 100. Seatbelt subsystem 102 of modal restraint system 100 secures occupant 104 to seat 106. Seatbelt subsystem 102 includes strap 108, which is positionable adjacent to occupant 104 so as to at least partially dispose occupant 104 between seat 106 and strap 108. Strap 108 includes a torso, or shoulder or upper, strap 110 positionable adjacent to the torso of occupant 104, and a lap, or lower, strap 112 positionable adjacent to the lap region of occupant 104. End 114 of strap 108 may be secured into a buckle 116. End 118 of strap 108 is selectively retractable into and extendable from strap feeder unit 120. Although strap feeder unit 120 is shown to be inside of seat 106 near the shoulder of occupant 104, strap feeder unit 120 may be located elsewhere proximate to seat 106. It will be appreciated by one of ordinary skill in the art that strap 108 is merely illustrative of a three-point restraint system, although in other embodiments the restraint system may include more or less than three fixation points.

Previous restraint systems have used either loose, fixed or inertia reel seatbelts. Loose seatbelts fail to sufficiently restrain the movement of an occupant's body in a high acceleration or HIC event. Fixed seatbelts provide limited comfort and mobility, depriving occupant 104 of the ability to reach objects or look around, such as peer through a nearby window 122. Inertia reel seatbelts, while providing comfort and mobility while loose, become fixed only as a result of a sudden extension of the strap, thereby causing an unacceptable delay in securing occupant 104 to seat 106 in view of the high accelerations experienced by aircraft. The illustrative embodiments address these and other issues by providing a modal restraint system that accommodates occupant comfort and mobility while adequately securing occupant 104 with minimal or no delay should a life-threatening acceleration event occur. In particular, strap feeder unit 120 is adapted to switch between an unfixed mode and a fixed mode. Strap 108 is extendable from and retractable into strap feeder unit 120 in unfixed mode. Strap 108 is substantially unextendable from strap feeder unit 120 in fixed mode. In the illustrated embodiment, strap feeder unit 120 is in unfixed mode by default.

Strap feeder unit 120 is operable to switch to fixed mode in response to a precautionary event, or collision-risk or acceleration-risk condition, thereby reducing the freedom of movement of occupant 104 relative to seat 106 of the aircraft. The precautionary event, which triggers seatbelt subsystem 102 to switch to fixed mode, may anticipate a life-threatening acceleration event, such as a hard landing, a collision, an uncontrolled descent, extreme turbulence, an HIC event or any other acceleration event with the potential to be injurious or fatal to a human being. It will be appreciated by one of ordinary skill in the art that the precautionary event triggering seatbelt subsystem 102 to switch to fixed mode may occur well before acceleratory, inertia or other involuntary motion of occupant 104 caused by the acceleration of the aircraft, thereby reducing the delay in securing occupant 104 to seat 106 as compared to traditional inertia reel seatbelts. Because the precautionary event may anticipate or occur prior to a life-threatening acceleration event, seatbelt subsystem 102 reduces the freedom of movement of occupant 104 during the life-threatening acceleration event, thereby enhancing the safety of occupant 104.

Seatbelt subsystem 102 includes a lock selector 124. Lock selector 124 may be in mechanical, electrical, wireless, computer or any other type of communication with strap feeder unit 120. In some embodiments, the precautionary event that causes or allows strap feeder unit 120 to switch to fixed mode is selection of lock selector 124 by occupant 104. For example, occupant 104 may perceive a threat to his or her safety, such as by sensing acceleration or by hearing an announcement from the pilot, and then select lock selector 124 to fixedly secure himself or herself to seat 106 as a precautionary measure. In the illustrated embodiment, lock selector 124 is a button 126, although in other embodiments lock selector 124 may be any input device such as a lever, knob, foot pedal, pull cord or voice-activated input. Button 126 may be a mechanical button or a digital button, such as an icon on a touchscreen. Although button 126 is shown to be proximate to seat 106, lock selector 124 may be located elsewhere, such as on a cellular phone or other personal communication device of occupant 104. In some embodiments, lock selector 124 may be switchable between a locked position and an unlocked position. The precautionary event may include switching lock selector 124 from the unlocked position to the locked position, thereby switching seatbelt subsystem 102 to fixed mode. For example, button 126 may be in either a pressed-down position (i.e., locked position) or an unpressed position (i.e., unlocked position). When occupant 104 pushes button 126 into the pressed-down position, seatbelt subsystem 102 may switch to fixed mode. Subsequently, occupant 104 may touch button 126 a second time to move button 126 into the unpressed position, thereby switching seatbelt subsystem 102 back into unfixed mode.

As best seen in FIG. 2C, strap feeder unit 120 includes a spool 128 operable to rotate in either a first direction 130 or a second direction 132 to wind or unwind strap 108 thereabout, respectively. Strap feeder unit 120 includes a locking module 134 that is operable to engage, mechanically and/or electromagnetically, with spool 128 when strap feeder unit 120 is in fixed mode to impede spool 128 from rotating in second direction 132, thereby rendering strap 108 substantially unextendable. In some embodiments, the unfixed mode of seatbelt subsystem 102 may be an inertia reel mode. The inertia reel mode may be implemented by an inertia reel subassembly 136 that is selectively engageable with spool 128. Inertia reel subassembly 136 may utilize a weighted pendulum, a centrifugal clutch, an electromagnetic mechanism or any other inertia reel implementations known by one of ordinary skill in the art.

Strap feeder unit 120 includes a retraction module 138 that is operable to retract strap 108 into strap feeder unit 120 by, for example, rotating spool 128 in first direction 130, thereby tightening strap 108 against occupant 104. In some embodiments, the fixed mode of seatbelt subsystem 102 may be a retracted fixed mode in which retraction module 138 retracts strap 108 into strap feeder unit 120. Strap feeder unit 120 may be further operable to switch to retracted fixed mode in response to the precautionary event to further reduce the freedom of movement of occupant 104 in case a life-threatening acceleration event occurs. In retracted fixed mode, the slack in strap 108 may be substantially reduced or minimized such that less than two fingers fit between strap 108 and the body of occupant 104. Using retraction module 138, seatbelt subsystem 102 can tighten strap 108 more than would have been otherwise possible under normal operating conditions since seatbelt subsystem 102 switches to retracted fixed mode in anticipation of a life-threatening acceleration event when safety takes precedence over comfort. Retraction module 138 may preload strap 108 using an electromagnetic tensioner, a mechanical pretensioner or any other strap-retracting technique or mechanism.

Figure 3A:
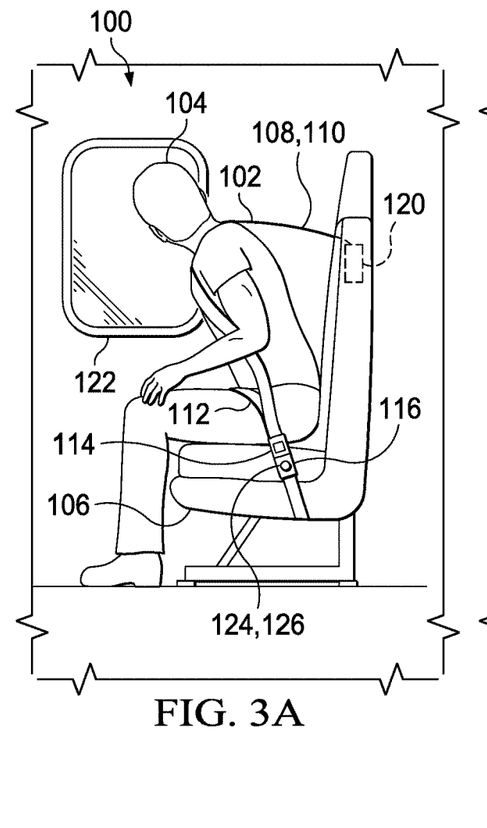
FIGS. 3A-3C are side views of various modes of a seatbelt subsystem in accordance with embodiments of the present disclosure.
Figure 3B:
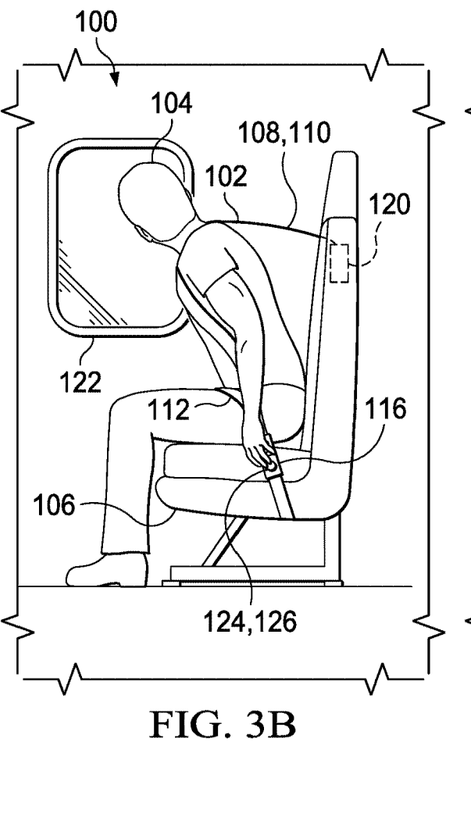
Figure 3C:
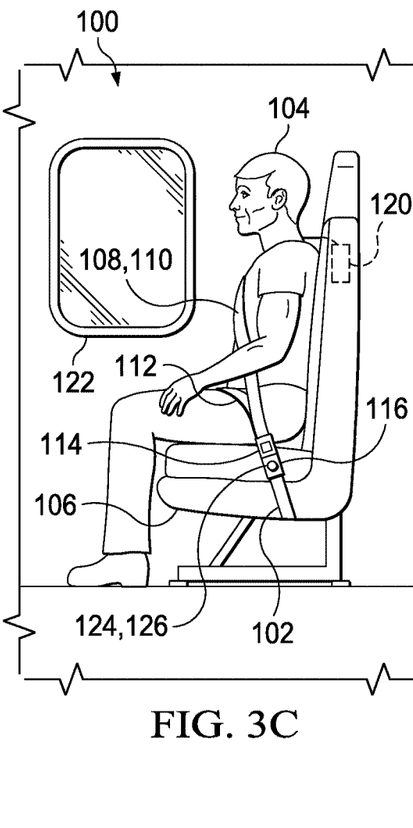

Referring to FIGS. 3A-3C in the drawings, a sequence of events illustrating the operation of seatbelt subsystem 102 is schematically illustrated. In FIG. 3A, seatbelt subsystem 102 is in default unfixed mode, such as inertia reel mode. In unfixed mode, occupant 104 is able to lean forward to look out window 122, as well as perform other functions requiring mobility. In FIG. 3B, occupant 104 senses or anticipates a possible acceleration event, such as an HIC event or a life-threatening acceleration event. For example, the aircraft may experience turbulence and occupant 104 may receive a precautionary warning from the pilot or elsewhere. In another example, the pilot may issue the precautionary warning to occupants based simply on the potential for experiencing turbulence ahead. In response, occupant 104 selects button 126, as shown in FIG. 3B, which is a precautionary event causing seatbelt subsystem 102 to switch to retracted fixed mode, as shown in FIG. 3C. In particular, strap feeder unit 120 retracts strap 108 so as to tighten strap 108 against occupant 104, thereby reducing the freedom of movement, including forward movement, of occupant 104 relative to seat 106. By securing occupant 104 against seat 106 in retracted fixed mode, forward and downward motion of the head and body of occupant 104 is reduced, as is the likelihood of occupant 104 hitting his or her head against surrounding structure, such as a wall. Likewise, occupant 104 may be further secured against seat 106 using lap strap 112 to reduce the movement of occupant 104 in the vertical direction.

Figure 4:
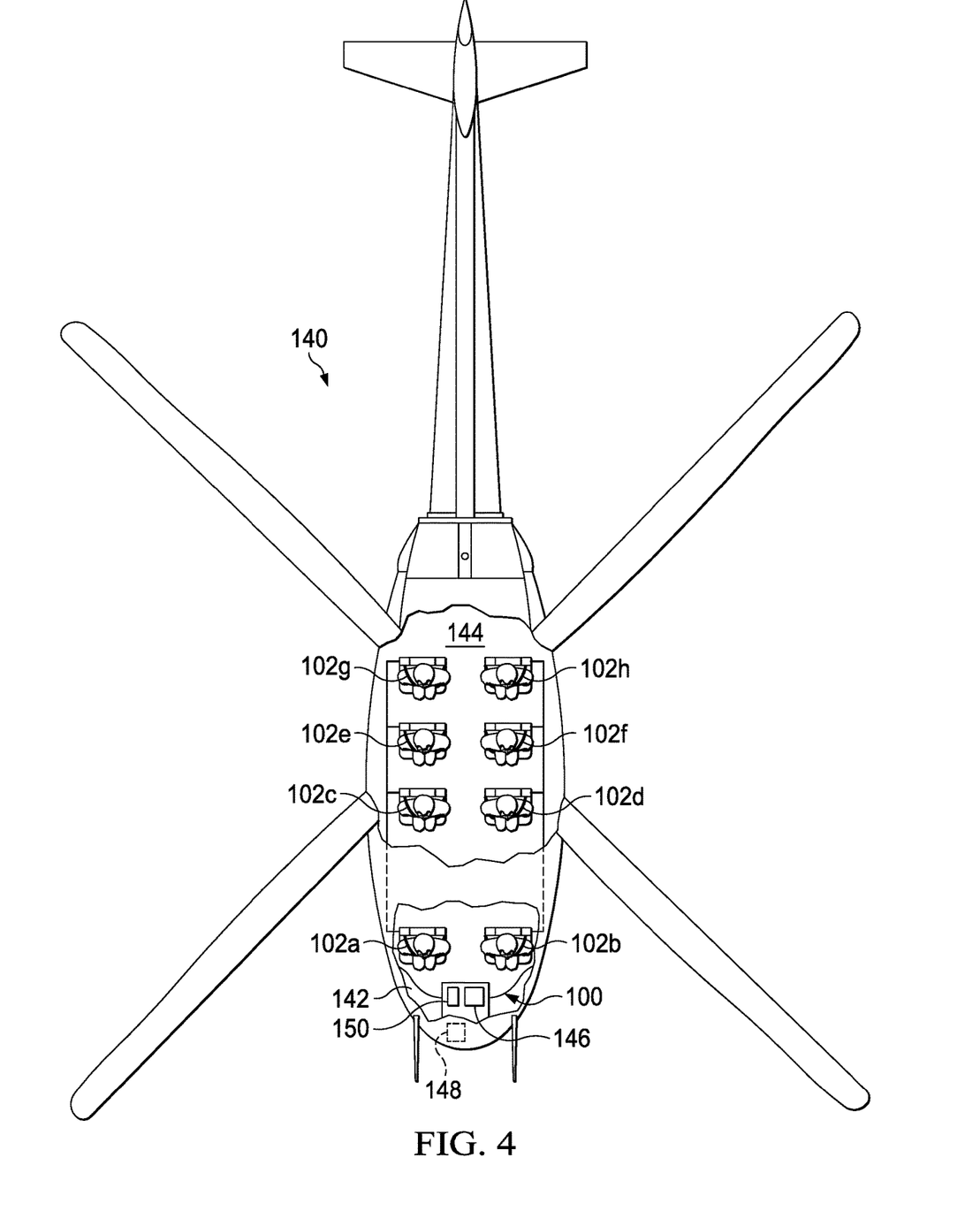
FIG. 4 is a top view of a rotorcraft implementing a modal restraint system in accordance with embodiments of the present disclosure.

Referring to FIG. 4 in the drawings, a rotorcraft including modal restraint system 100 is schematically illustrated and generally designated 140. Modal restraint system 100 includes seatbelt subsystems 102a, 102b in cockpit 142 and seatbelt subsystems 102c-102h in passenger cabin 144. Modal restraint system 100 includes a master lock selector 146 located in cockpit 142. Master lock selector 146 is in communication with each of seatbelt subsystems 102a-102h. Master lock selector 146 may be in mechanical, electrical, computer, wireless or any other form of communication with seatbelt subsystems 102a-102h. Furthermore, master lock selector 146 may be in communication with any number of seatbelt subsystems in cockpit 142 and/or passenger cabin 144. In some embodiments, the precautionary event that causes or allows the strap feeder units of each of seatbelt subsystems 102a-102h to switch to fixed mode or retracted fixed mode may be the selection of master lock selector 146 by a person in cockpit 142, such as a pilot. All or just a portion of seatbelt subsystems 102a-102h may switch to either fixed mode or retracted fixed mode in response to the selection of master lock selector 146, which may take the form of a button, lever, knob, pull cord or any other input device. Master lock selector 146 allows a pilot or other occupant to engage one of the fixed modes for seatbelt subsystems of other occupants, which may be critical if the other occupants of rotorcraft 140 are unable to engage their own seatbelt subsystems into fixed mode due to unconsciousness or another reason.

In some embodiments, rotorcraft 140 may include one or more sensors 148 each operable to detect operational parameters of rotorcraft 140. In such embodiments, the precautionary event causing modal restraint system 100 to switch to fixed mode or retracted fixed mode includes sensors 148 detecting one or more operational parameters to be beyond, including either above or below, a predetermined threshold. For example, sensors 148 may include an accelerometer, or health monitoring system, and the precautionary event may be the accelerometer detecting an acceleration of rotorcraft 140 beyond a predetermined threshold, as may occur due to turbulence or choppy air. In another example, sensors 148 may include a descent rate sensor and the precautionary event may occur when the descent rate sensor detects a descent rate of rotorcraft 140 beyond a predetermined threshold. Sensors 148 may also include a yaw rate sensor, a roll rate sensor and/or a pitch rate sensor and the precautionary event may occur if one of these sensors detects a yaw rate, roll rate or pitch rate of rotorcraft 140 beyond a predetermined threshold. In other embodiments, sensors 148 may include a traffic alert sensor using sonar, radar, GPS or other technology to detect the presence of air traffic within a predetermined range from rotorcraft 140. In these embodiments, the precautionary event triggering one of the fixed modes may include the traffic alert sensor detecting air traffic within a predetermined range of rotorcraft 140. Sensors 148 may also include a landing, or skid, gear sensor and the precautionary event may include the landing gear sensor detecting deployment of the landing gear of rotorcraft 140. Sensors 148 may also include a mechanical failure sensor and the precautionary event may include the mechanical failure sensor detecting a mechanical failure of rotorcraft 140. For example, modal restraint system 100 may switch to fixed mode or retracted fixed mode if the mechanical failure sensor detects an engine failure, transmission or engine oil loss or high transmission temperature. The strap feeder units of seatbelt subsystems 102a-102h may revert or switch back to default unfixed mode or inertia reel mode when the operational parameters detected by sensors 148 return to their normal range or setting.

In some embodiments, the precautionary event triggering modal restraint system 100 to switch to fixed mode or retracted fixed mode may include visibility around rotorcraft 140 becoming limited due to weather, as may occur when flying through clouds or fog. In such embodiments, rotorcraft 140 may include two or more flight operation modes selectable based on visibility around rotorcraft 140. The flight operation modes may include a visual flight rules operation mode and an instrument flight rules operation mode. Because visual flight rules operation mode is not used by rotorcraft 140 in low visibility, rotorcraft 140 may switch to instrument flight rules operation mode in such circumstances. The precautionary event that causes or allows modal restraint system 100 to switch to fixed mode or retracted fixed mode may include rotorcraft 140 switching to instrument flight rules operation mode, thus securing the occupants of rotorcraft 140 against their respective seats should high acceleration occur in these low visibility circumstances. The strap feeder units of seatbelt subsystems 102a-102h may then revert or switch back to default unfixed mode or inertia reel mode in response to rotorcraft 140 switching from instrument flight rules operation mode to visual flight rules operation mode, as may occur when visibility is restored around rotorcraft 140.

The strap feeder units of seatbelt subsystems 102a-102h may revert or switch back to default unfixed mode or inertia reel mode anytime after the precautionary event. For example, seatbelt subsystems 102a-102h may revert or switch to default unfixed mode upon cessation of a predetermined time period commencing upon occurrence of the precautionary event. Seatbelt subsystems 102a-102h may also revert or switch back to default unfixed mode manually, such as by a subsequent selection of lock selector 124, master lock selector 146 and/or a separate selector or button. The pilot may also be able to override any selections of lock selectors 124 by occupants in passenger cabin 144 since the pilot may be best equipped to determine the mode of modal restraint system 100.

Modal restraint system 100 may also include a master release selector 150, enabling an occupant of cockpit 142 to select master release selector 150 to switch modal restraint system 100 to unfixed mode or inertia reel mode and select master lock selector 146 to switch modal restraint system 100 to fixed mode or retracted fixed mode. Furthermore, each of seatbelt subsystems 102a-102h may include both a lock selector 124 and a release selector (not shown), which switches the respective seatbelt subsystem 102a-102h to unfixed mode or inertia reel mode. The default mode of modal restraint system 100 may be reversible or changeable by a pilot, ground technician, occupant or other person. Furthermore, the default mode of seatbelt subsystems 102a-102h may be individually or collectively reversible or changeable. For example, a pilot may change the default mode of modal restraint system 100 from unfixed mode to fixed mode, or vice versa, depending on the circumstances.

Figure 5A:
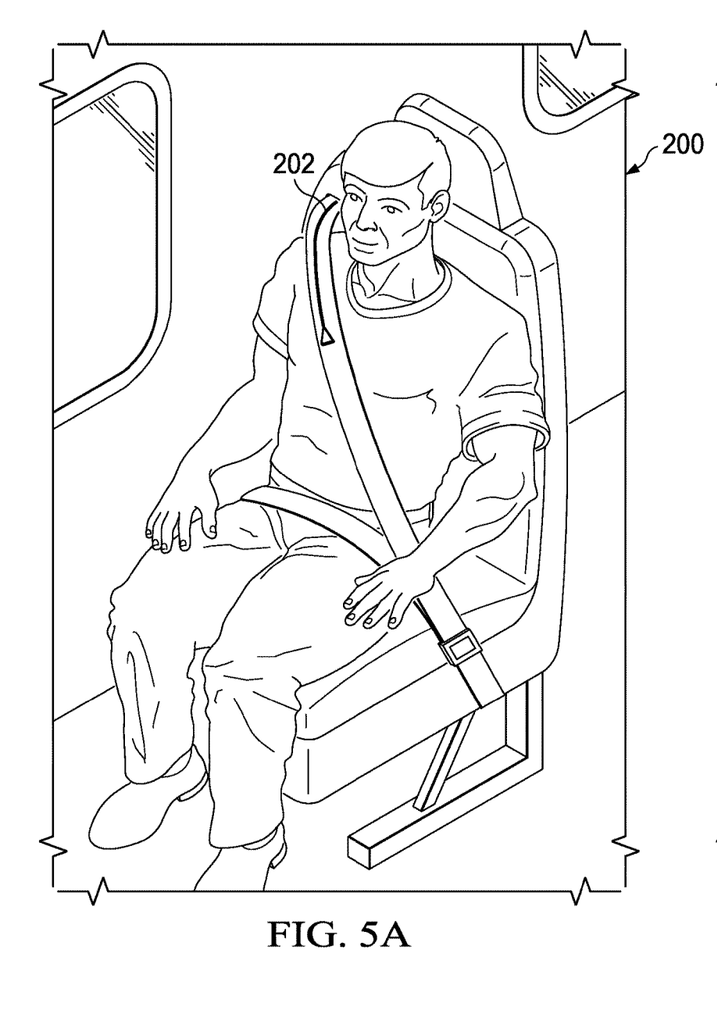
FIGS. 5A-5D are various views of seatbelt subsystems having different configurations in accordance with embodiments of the present disclosure.
Figure 5B:
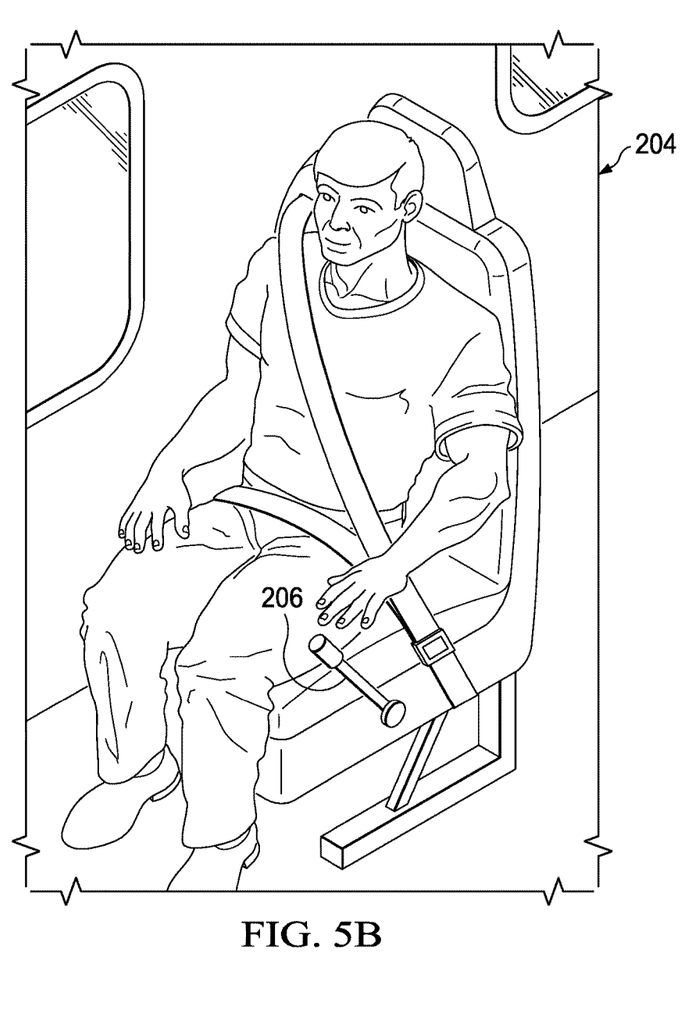
Figure 5C:
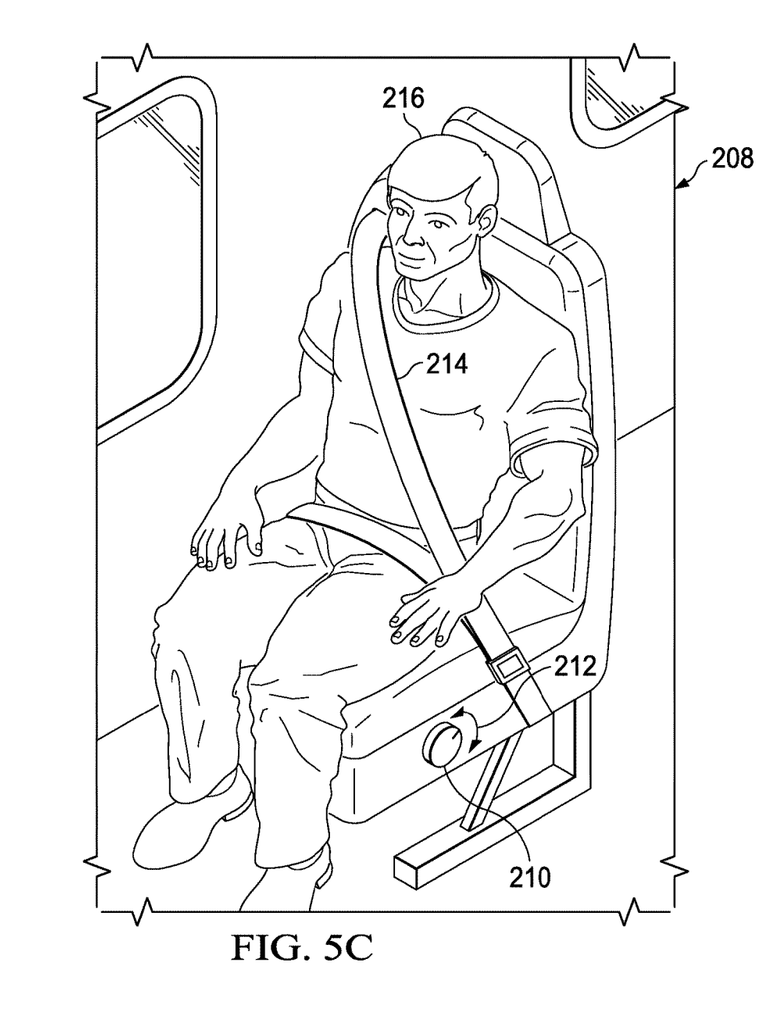
Figure 5D:
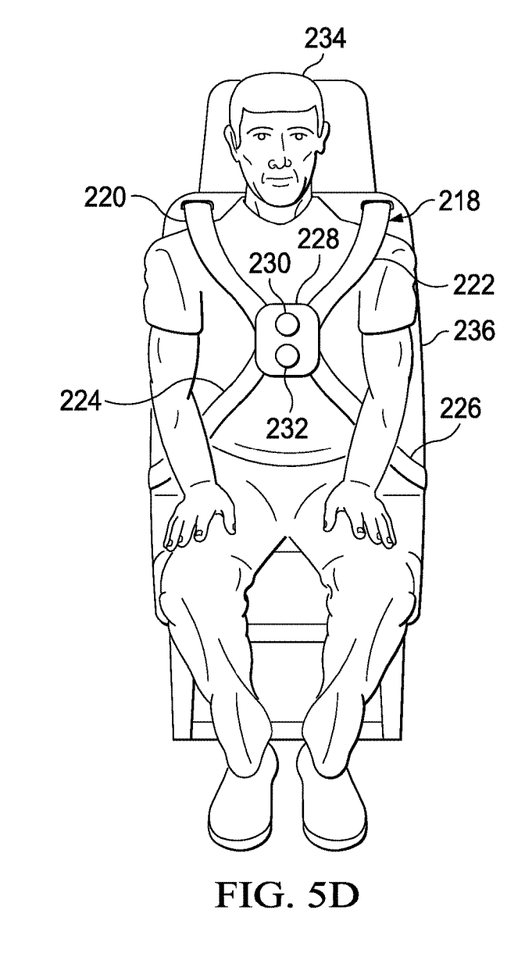

Referring to FIGS. 5A-5D in the drawings, various configurations of a seatbelt subsystem are schematically illustrated. In FIG. 5A, seatbelt subsystem 200 includes a pull cord 202. Pull cord 202 may be a lock selector. In FIG. 5B, seatbelt subsystem 204 includes a lever 206. In some embodiments, lever 206 may be a lock selector rotatable between a locked position and an unlocked position, and rotating lever 206 from the unlocked position to the locked position may be a precautionary event causing seatbelt subsystem 204 to switch to fixed mode or retracted fixed mode. In FIG. 5C, seatbelt subsystem 208 includes a rotatable knob 210. Knob 210 is rotatable in either of directions 212 to either loosen or tighten strap 214. For example, if occupant 216 perceives the possibility of an imminent acceleration event, occupant 216 may rotate knob 210 to tighten strap 214. Conversely, occupant 216 may rotate knob 210 to loosen strap 214 if he or she desires comfort or mobility. Knob 210 allows occupant 216 to more precisely select the looseness or tightness of strap 214 within a range of looseness/tightness settings. In other embodiments, seatbelt subsystem 208 may include a lock selector foot pedal. In FIG. 5D, seatbelt subsystem 218 includes four torso straps 220, 222, 224, 226, one or more of which are retractable into or extendable from one or more strap feeder units (not visible). In the illustrated embodiment, torso straps 220, 222, 224, 226 may have individual buckles that couple with hub unit 228, which may include either or both of lock selector 230 or a release selector 232, the latter of which allows one or more of torso straps 220, 222, 224, 226 to extend. In contrast to previously illustrated embodiments, hub unit 228 is located proximate to the chest area of occupant 234, placing lock selector 230 and/or release selector 232 within easy reach of occupant 234.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A modal restraint system for an occupant of a seat of an aircraft comprising:
    a strap feeder unit; and
    a strap selectively retractable into and extendable from the strap feeder unit, the strap positionable adjacent to the occupant so as to at least partially dispose the occupant between the strap and the seat;
    wherein, the strap feeder unit is adapted to switch between a plurality of modes including an unfixed mode and a fixed mode, the strap extendable from and retractable into the strap feeder unit in the unfixed mode, the strap substantially unextendable from the strap feeder unit in the fixed mode;
    wherein, the strap feeder unit is in the unfixed mode by default;
    wherein, the strap feeder unit is operable to switch to the fixed mode in response to a precautionary event, thereby reducing freedom of movement of the occupant relative to the seat of the aircraft;
    wherein, the aircraft further comprises landing gear and a landing gear sensor configured to detect deployment of the landing gear; and
    wherein, the precautionary event further comprises the landing gear sensor detecting deployment of the landing gear, the strap feeder unit switching from the unfixed mode to the fixed mode in response to deployment of the landing gear.

2. The modal restraint system as recited in claim 1 wherein the strap further comprises a torso strap positionable adjacent to the torso of the occupant and a lap strap positionable adjacent to the lap region of the occupant.

3. The modal restraint system as recited in claim 1 wherein the precautionary event anticipates a life-threatening acceleration event including at least one of a hard landing, a collision, an uncontrolled descent and turbulence.

4. The modal restraint system as recited in claim 1 wherein the strap feeder unit switches from the fixed mode to the unfixed mode in response to retraction of the landing gear.

5. The modal restraint system as recited in claim 1 further comprising a lock selector in communication with the strap feeder unit and wherein the precautionary event further comprises selection of the lock selector by the occupant.

6. The modal restraint system as recited in claim 5 wherein the lock selector further comprises an input device selected from the group consisting of a button, a lever, a knob or a pull cord.

7. The modal restraint system as recited in claim 1 wherein the strap feeder unit further comprises a spool operable to rotate in first and second directions to wind and unwind the strap thereabout, respectively.

8. The modal restraint system as recited in claim 7 wherein the strap feeder unit further comprises a locking module, the locking module engaging with the spool when the strap feeder unit is in the fixed mode to impede the spool from rotating in the second direction such that the strap is substantially unextendable.

9. The modal restraint system as recited in claim 7 wherein the plurality of modes further comprise a retracted fixed mode;
wherein the strap feeder unit further comprises a retraction module adapted to rotate the spool in the first direction to retract the strap into the strap feeder unit in the retracted fixed mode, thereby tightening the strap against the occupant; and
wherein the strap feeder unit is further operable to switch to the retracted fixed mode in response to the precautionary event.

10. The modal restraint system as recited in claim 7 wherein the unfixed mode further comprises an inertia reel mode; and
wherein the strap feeder unit further comprises an inertia reel subassembly selectively engagable with the spool in the inertia reel mode.

11. An aircraft comprising:
a fuselage;
landing gear coupled to the fuselage;
a landing gear sensor configured to detect deployment of the landing gear;
a plurality of seats in the fuselage; and
a modal restraint system including a plurality of seatbelt subsystems, each seatbelt subsystem adapted to secure an occupant to one of the seats, each seatbelt subsystem comprising:
a strap feeder unit; and
a strap selectively retractable into and extendable from the strap feeder unit, the strap positionable adjacent to the occupant so as to at least partially dispose the occupant between the strap and the seat;
wherein, the strap feeder unit is adapted to switch between a plurality of modes including an unfixed mode and a fixed mode, the strap extendable from and retractable into the strap feeder unit in the unfixed mode, the strap substantially unextendable from the strap feeder unit in the fixed mode;
wherein, the strap feeder unit is in the unfixed mode by default;
wherein, the strap feeder unit is operable to switch to the fixed mode in response to a precautionary event, thereby reducing freedom of movement of the occupant relative to the seat; and
wherein, the precautionary event further comprises the landing gear sensor detecting deployment of the landing gear, the strap feeder unit switching from the unfixed mode to the fixed mode in response to deployment of the landing gear.

12. The aircraft as recited in claim 11 wherein the unfixed mode further comprises an inertia reel mode.

13. The aircraft as recited in claim 11 wherein the plurality of modes further comprise a retracted fixed mode, the strap feeder unit retracting the strap in the retracted fixed mode to tighten the strap against the occupant; and
wherein the strap feeder unit is further operable to switch to the retracted fixed mode in response to the precautionary event.

14. The aircraft as recited in claim 11 further comprising:
a mechanical failure sensor;
wherein the precautionary event further comprises the mechanical failure sensor detecting an aircraft mechanical failure.

15. The aircraft as recited in claim 11 wherein the modal restraint system further comprises a master lock selector in communication with each of the seatbelt subsystems;
wherein the precautionary event further comprises selection of the master lock selector; and
wherein the selection of the master lock selector causes the strap feeder units of each of the seatbelt subsystems to switch to the fixed mode.

16. The aircraft as recited in claim 11 further comprising:
a traffic alert sensor;
wherein the precautionary event further comprises the traffic alert sensor detecting air traffic within a predetermined range of the aircraft.

17. The aircraft as recited in claim 11 further comprising:
a plurality of flight operation modes including a visual flight rules operation mode and an instrument flight rules operation mode;
wherein the precautionary event further comprises switching from the visual flight rules operation mode to the instrument flight rules operation mode.

18. The aircraft as recited in claim 17 wherein the strap feeder unit is further operable to return to the unfixed mode in response to switching from the instrument flight rules operation mode to the visual flight rules operation mode.

19. The aircraft as recited in claim 11 further comprising:
one or more sensors each operable to detect an operational parameter;
wherein the precautionary event further comprises the one or more sensors detecting the operational parameter to be beyond a predetermined threshold.

20. The aircraft as recited in claim 19 wherein the one or more sensors further comprise one or more sensors selected from the group consisting of an accelerometer, a descent rate sensor, a yaw rate sensor, a roll rate sensor, a pitch rate sensor and a traffic alert sensor.

* * * * *